United States Patent [19]

Couleur et al.

[11] 4,300,192

[45] Nov. 10, 1981

[54] METHOD AND MEANS FOR STORING AND ACCESSING INFORMATION IN A SHARED ACCESS MULTIPROGRAMMED DATA PROCESSING SYSTEM

[75] Inventors: John F. Couleur, Scottsdale; Robert F. Montee, Phoenix, both of Ariz.

[73] Assignee: Honeywell Information Systems Inc.

[21] Appl. No.: 960,574

[22] Filed: Nov. 14, 1978

Related U.S. Application Data

[63] Continuation of Ser. No. 462,144, Apr. 18, 1974.

[51] Int. Cl.³ .................... G06F 9/46; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,412,382 | 11/1968 | Couleur et al. | 364/200 |
| 3,839,706 | 10/1974 | Borchsenius | 364/200 |
| 3,891,974 | 6/1975 | Coulter et al. | 364/200 |
| 3,916,385 | 10/1975 | Parmar et al. | 364/200 |
| 3,938,096 | 2/1976 | Brown et al. | 364/200 |
| 4,064,304 | 1/1978 | Beausoleil et al. | 364/200 |
| 4,068,300 | 1/1978 | Bachman | 364/200 |

Primary Examiner—Mark E. Nusbaum
Assistant Examiner—Eddie P. Chan
Attorney, Agent, or Firm—Finnegan, Henderson, Farabow, Garrett & Dunner

[57] ABSTRACT

Partitioning, paging, and segmentation techniques are employed with virtual memory to provide more secure and efficient storage and transfer of information. The virtual memory is divided into a plurality of partitions with real memory storage provided by paging the plurality of partitions. User programs are segmented into logical units and stored in assigned partitions thereby isolating user programs and data. Unsegmented programs may be run by storage in a partition with direct addressing. Segment descriptors including partition, base, and bound are utilized in accessing memory. User domains are expandable by temporarily passing descriptor parameters from one routine to another with access flags limiting access thereto. By shrinking passed descriptors the receiving routine can be restricted to only a portion of the information defined by the descriptor.

5 Claims, 11 Drawing Figures

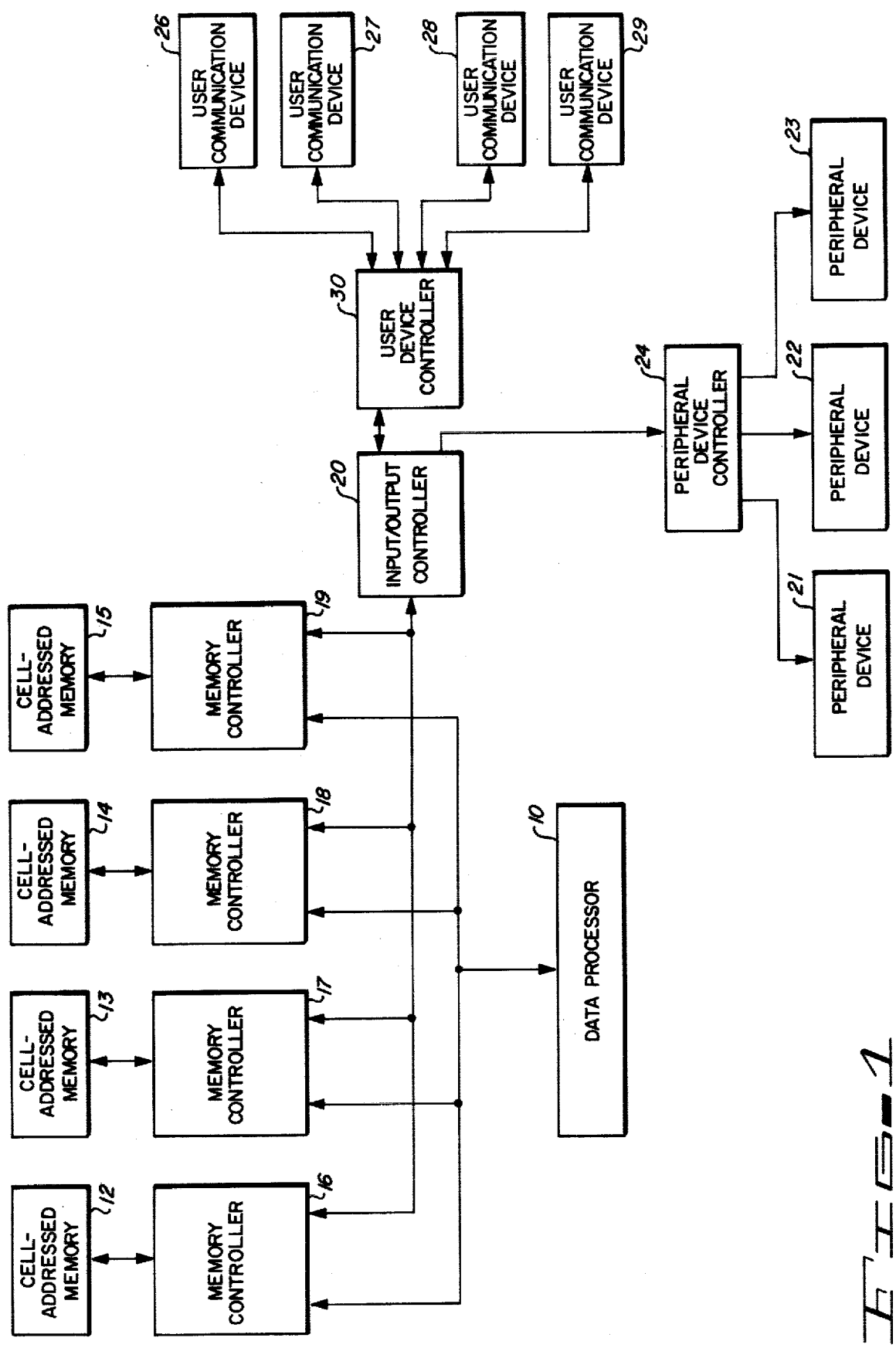

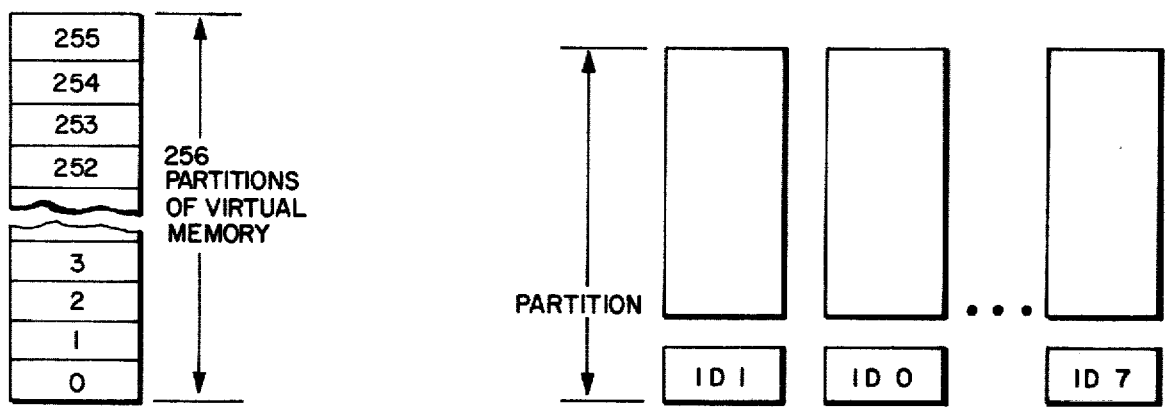
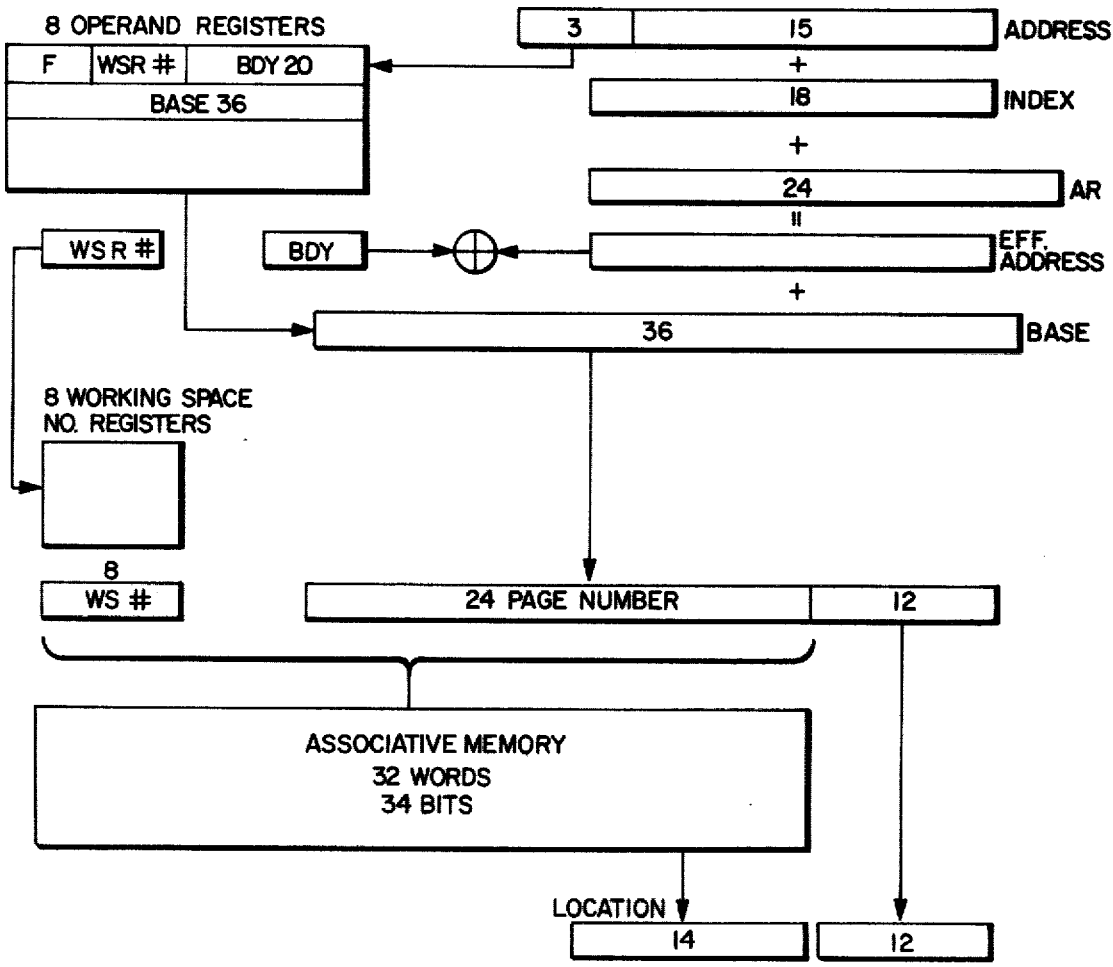

IF NOT IN ASSOCIATIVE MEMORY
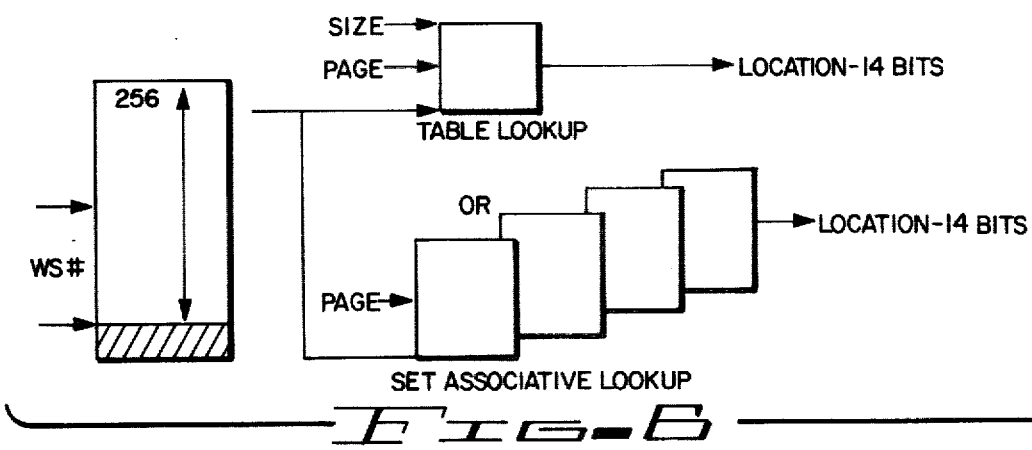
FIG-6
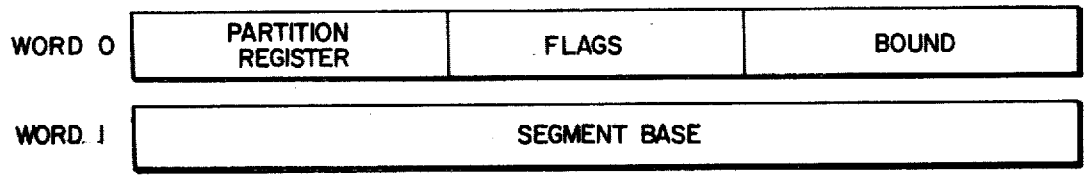
FIG-7
| LINE | OPERAND DESCRIPTOR REGISTER NO. 2 (ODR2) | ADDRESS REGISTER NO. 2 (AR2) | INDEX REGISTER NO. 4 (XR4) | INSTRUCTION *OFFSET* *INDEX* *ADDRESS* |
|---|---|---|---|---|
| 1 | BASE OF SEGMENT B | 0 | - | LDA 200, ,2 |
| 2 | BASE OF SEGMENT B | 200 | - | LDA 0, ,2 |
| 3 | BASE OF SEGMENT B | 100 | - | LDA 100, ,2 |
| 4 | BASE OF SEGMENT B | 100 | 100 | LDA 0,4 ,2 |
| 5 | (BASE OF SEGMENT B) +100 | 100 | - | LDA 0, ,2 |
| 6 | (BASE OF SEGMENT B) +100 | 0 | 100 | LDA 0,4 ,2 |
| 7 | (BASE OF SEGMENT B) +200 | 0 | - | LDA 0, ,2 |
FIG-10

METHOD AND MEANS FOR STORING AND ACCESSING INFORMATION IN A SHARED ACCESS MULTIPROGRAMMED DATA PROCESSING SYSTEM

This is a continuation, of application Ser. No. 462,144, filed Apr. 18, 1974.

BACKGROUND OF THE INVENTION

This invention relates generally to data processing systems, and more particularly to the storing and accessing of information in data processing systems.

Present-day large-scale data processing systems typically include a plurality of processors and permit multiple, interactive program execution by local and remote users. To accommodate such processing volume sizable data memory must be provided for user programs and data, operating system software, and shared application programs. Further, sophisticated software and hardware are necessary to manageably manipulate programs and data as the various activities are executed in the system processors.

In satisfying user requirements without exacting a prohibitive price for system core memory, data processing systems employ "extended memories" in which the primary or core memory of the system is supplemented by secondary or bulk storage in the form of magnetic disks, for example. Thus, while any one user may actually be occupying a small portion of main memory during program execution, to the user the "virtual memory" appears to be much larger due to the extension of main memory provided by the secondary storage.

Storage of information in the main and extended memory may take the form of segments and pages wherein the user programs are divided into variable length segments and the segments may include a plurality of uniform length data pages. The use of paging permits flexibility of information storage in available memory space wherever located, with a page table provided to permit user location of the stored pages.

U.S. Pat. No. 3,412,382, of Couleur and Glazer describes a shared access, multiprogrammed data processing system of the described type and which is commercially available as the Honeywell 6100 Series Systems. As described therein, storage cells in the real memory are provided with absolute addresses, and users access the cells at their respective absolute addresses by the employment of relative addresses. For example, during the execution of a user's paged segment wherein a relative cell address is provided by the data processor, the intermediate or relative segment address provides for locating a special data word or pointer of the page being addressed, the special data word combining with the relative address to provide the absolute address of the required memory cell. More specifically, base designations are provided in real storage to locate data stored therein, the base designations forming a part of descriptor words of shared data. Since data is moved around in real storage the absolute addresses of the stored data are constantly changing, and descriptor words are employed to locate page tables and segments as well as desired pages. Thus, a segment descriptor word includes the base address of a corresponding segment, if the segment is non-paged, or the base address of the corresponding segment page table, if the segment is paged. A page table word provides the base address of a page of the corresponding segment.

The system processor cyclically executes portions of user programs as defined in the segment. Thus, a program segment readied for execution is stored wherever available space is located in the cell addressed memory with the relative address of the segment transformed to the absolute real memory address by combining the word number of a relative address and the base address in the corresponding page table for the stored segment. In locating the absolute addresses, a Procedure Base Register is employed for the current procedure segment, while a plurality of Address Base Registers are employed for cells external to the current procedure segments. Pointers, which are employed either as an identification of a descriptor word or the relative address of a descriptor word, are stored in a Temporary Base Register (TBR) during a current address transformation operation wherein the segment descriptor word, if unpaged, or the paged table word, if paged, is located in main memory or in the extended call address memory through a search operation for a matching pointer. Once the segment descriptor word or page table word is located, the segment absolute address of the desired memory location is obtained by combining the pointer therewith.

In executing a user program, the operating system combines the needed portions of the operating system with the user program segments in such a manner as to perform the task requested by the user. Since the operating procedures execute as part of the user process and are indistinguishable therefrom, special means of protection against unauthorized access and modification is required. Conventionally, segments of the operating system and of user processes exist and execute in a number of mutually exclusive subsets or rings having different levels of security status. As a process executes, it makes calls to other segments of the user code and to segments of the operating system, and as long as the external references are applied to segments that exist within the same security status or ring as that of the segment currently executing, no ring protection check is placed upon accessing the segments. Thus, segments within any one status level or ring are protected against unauthorized access from a lower status segment, but protection is not afforded against unauthorized access from segments of equal or higher rings or security status levels.

SUMMARY OF THE INVENTION

The present invention is directed to an improvement in the method and means for storing and accessing data in a large-scale system, such as the system described by Couleur and Glazer. By uniquely employing partitioning, segmentation, and paging techniques direct addressing of storage is permitted. Further, by employing virtual memory partitions, some of which may be shared and some of which may be exclusively assigned, increased security of user programs and data is provided through user isolation. The partitions in the virtual memory provide a much larger storage for program segments than was previously available. Moreover, the granting of limited access to secure areas or domains for a called program is securely effected by the provision of descriptors which identify segments in storage. Additionally, by "shrinking" descriptors the memory accessed by a called program may be reduced to the specific data within a segment which is essential to the called program with the remaining portions of the segment being barred therefrom.

Batch processing and time-sharing users are often more concerned with efficiency than security. Advantageously, in accordance with the present invention these users are allowed to run programs in conventional, unsegmented modes of operation.

Accordingly, an object of the present invention is to provide a data processing system offering improved security to system users.

Another object of the invention is to provide an improved method of storing and accessing information in a data processing system.

Still another object of the invention is to provide a data processing system which offers improved security for some users yet allows efficient program execution for users less concerned with security.

Yet another object of the invention is to provide means in a data processing system for securely allowing limited access for a called procedure to stored information.

These and other objects and features of the invention will be more fully appreciated from the following detailed description and appended claims when taken with the drawings.

DESCRIPTION OF THE DRAWINGS

FIG. 1 is a block diagram of a shared-access multi-programmed data processing system to which the present invention is applicable;

FIG. 2 is a symbolic diagram of memory partitioning in accordance with one aspect of the invention;

FIG. 3 is a block diagram of partitions and registers available to a user of a data processing system in accordance with the invention;

FIG. 4 is a word layout for a page address in accordance with one embodiment;

FIGS. 5 and 6 illustrate three methods of obtaining physical location in memory from a page address;

FIG. 7 is a word-pair layout for a segment descriptor in accordance with one embodiment;

FIG. 10 illustrates instruction format and descriptor shrinking in accordance with the invention.

DESCRIPTION OF ILLUSTRATIVE EMBODIMENTS

Figure 8:
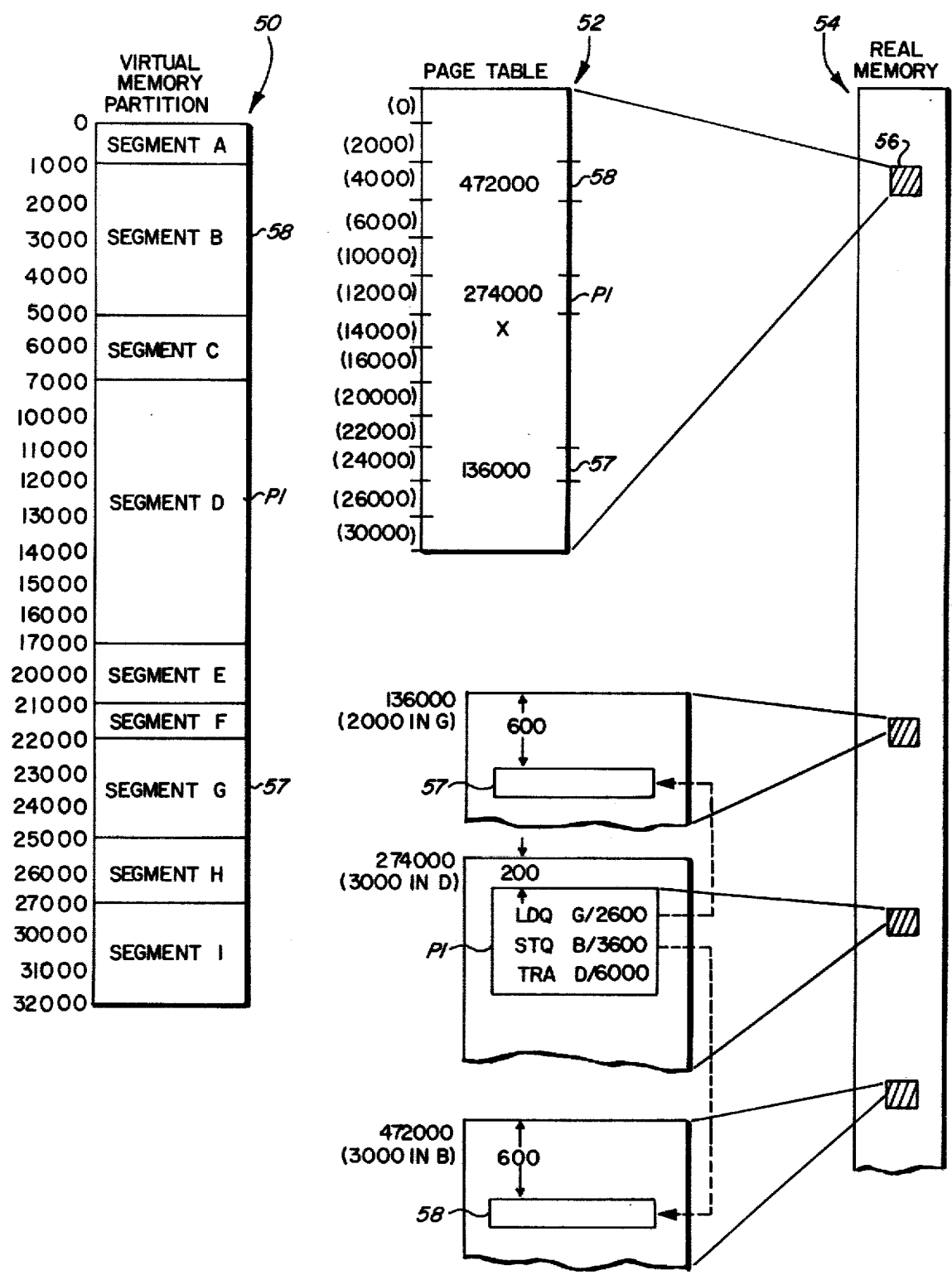
FIG. 8 is a symbolic representation of program segmentation and memory paging in accordance with one embodiment.

FIG. 1 is a block diagram of a shared access data processing system to which the instant invention is applicable. In this illustrative system data processor 10 executes the data processing functions required by all programs. Thus, data processor 10 alternately responds to a plurality of distinct instructions of different user programs to perform corresponding data processing operations on information received by processor 10. The instructions of each program are supplied to the processor in the sequential order necessary to control the processor to execute the corresponding data processing operations. Accordingly, the processor executes a predetermined maximum number of instructions of a user program before proceeding to service the next program. During each service interval the processor may execute all the instructions of an entire user program or only a part thereof. While a single processor is shown, the present invention is applicable to multiple processor shared-access systems.

A plurality of memories 12, 13, 14, and 15 store data words representing information which is to be processed, data words representing information which is the result of processing, and data words representing instructions of the programs to be executed by the data processor. Each data word is stored in a discrete memory location or cell. For a data word to be inserted into or retrieved from a particular cell, the memory must be supplied with an identification or address of the cell.

Each of the plurality of memory controllers 16-19 communicates with and controls access to a respective one of memories 12-15, supplying the cell address to the memory, supplying data words for insertion into the address cell, and receiving data words retrieved from the addressed cell.

Data processor 10 communicates with one or more of memories 12-15 through their respective memory controllers to receive instructions and data words for processing, and to transmit for storage data words which result from data processing operations.

Input/output controller 20 executes a limited number of instructions to function as an automatic information transfer apparatus, providing communication between memory controllers 16-19 and a plurality of external devices. These external devices supply information for processing, supply programs to process the information, and receive the processed result information. One form of external device is designated generally herein as peripheral devices 21, 22 and 23. These peripheral devices include, for example, magnetic disks, drums and tape handlers; punched card and paper tape reader; and document readers. This form of peripheral device stores information and programs as mechanical representations, and during retrieval of the stored information converts these mechanical representations to corresponding electrical signals and transmits these signals to a peripheral device controller 24. Controller 24 provides transfer of the electrical signals delivered by a peripheral device to the input/output controller 20. Other of the peripheral devices 21, 22 and 23 function to automatically receive processed information and convert it to a form specified by the user system, including, for example, magnetic tape handlers and card punches, which receive and store processed information for subsequent use by a data processing system, and high-speed printers which display the processed information for immediate use. This latter form of peripheral device receives electrical signals from controller 24 and converts these signals to the requisite mechanical representations. The electrical signals are received by peripheral device controller 24 from input/output controller 20.

An additional plurality of external devices, designated as user communication devices 26, 27, 28, and 29, each under direct manual control of a user, supplies programs for execution by processor 10 and supplies control information for initiating and controlling the execution of programs stored in peripheral devices 21, 22 and 23. Communication devices 26-29 also supply information for processing and display processed information. A user device controller 30 provides transfer of electrical signals representing the programs, information for processing, and control information supplied by communication devices 26-29 to input/output controller 20. Additionally, controller 30 transfers signals representing processed information and controlled information supplied by input/output controller 20 to user communication devices 26-29.

Input/output controller 20 controls the transfer of the signals received thereby from controllers 24 and 30 to one or more of memories 12-15 through their respective memory controllers 16-19. Input/output controller 20 also controls the transfer of signals received thereby from one or more controllers memories 12-15 to one of controllers 24 and 30.

The details of cell-addressed memories 12-15 and data processor 10 are described in U.S. Pat. No. 3,412,382 "Shared-Access Data Processing System," which is incorporated herein by reference.

Accordingly, the system of FIG. 1 provides immediate and simultaneous data processing services for a plurality of users, each user communicating with the system through a respective user communication device to initiate and control the execution of the programs, to supply data for processing, and to receive and display processed data. The system alternately executes the programs of all users who may at any time be directly communicating with the system, limiting the maximum delay experienced by each such user to a time commensurate with his reaction time. In this way the system performs enough continuous processing for each individual user to meet his needs or to match the input and output speed capabilities of his communication device. As a consequence the user is unaware that the processor is not continuously serving his needs and the plurality of users are provided quasi-simultaneous use and control of the system. The present invention involves two levels of memory allocation. Virtual memory is divided into partitions and the partitions are allocated to program segments. Segments are the logical subject matter breakdown of a user program for execution purposes. The second level of memory is the real memory which is divided into pages and pages are allocated to the partitions which exist in virtual memory. Memory mapping is the procedure by which information which is addressed in virtual memory can be found through addresses in the real memory.

In accordance with one aspect of the present invention, the "virtual memory" seen by a system user is divided into a plurality of large partitions in which all information is stored. For example, in the illustrative embodiment of FIG. 2 a system virtual memory shown generally at 32 is divided into 256 partitions each having a storage capacity of $2^{34}$ words ($2^{36}$ bytes). As will be further described hereinbelow, this partition size permits dedication of a partition to batch processing for efficient program execution, but without the security features available.

Conventionally, virtual memories have been divided into units large enough only to accommodate program segments, typically of a size on the order of $2^{20}$ bytes. Thus, the partitions used herein are approximately 75,000 times as large as the conventional virtual memory segments.

Some partitions may be shared by all system users, while other partitions are dedicated to a particular user. The operating system, for example, may occupy one partition and this partition is accessible to all users. A user's programs and data may be stored in another partition which is accessible only to the assigned user and any process or routine authorized by the assigned program. In FIG. 3, for example, a program in execution has access to eight of the 256 partitions of FIG. 2 with identification registers ID0-ID7 providing partition identification to the user program. Thus, isolation of user data and programs is provided, and because of the large size of the memory partitions, direct addressing of memory is effected. Moreover, security is enhanced by limiting a user's access to memory to the few partitions necessary for his program execution.

The storage of information in the plurality of partitions is through known paging techniques. Data is stored in uniform sized groups or pages, e.g., 1024 words or 4096 bytes each, which are stored in available space wherever found in real memory. Paging allows memory mapping capability thereby obviating the need for periodic memory compacting and reduces the user's requirements in main memory during program execution. In U.S. Pat. No. 3,412,382, memory is described as the use of relative addresses to permit the storage of segments in whatever portion of the cell-addressed memory group is available at the time the segment is being executed. This use of relative addresses then provides a great flexibility in the combination of segments which may be executed at any one time. Memory mapping is described in greater detail at column 7, line 67 through column 8, in the above-identified patent.

Since information is stored in established partitions, any active element in the system can reference stored data by concatenating a partition identifier with a page address. In a preferred embodiment, the page address includes a word and byte location within the page. For example, using the 256 partitions, each with $2^{36}$ byte capacity, a 4096 byte page will employ a 36-bit address (24 bits for page address and 12 bits for word-byte location within the page) which is concatenated with an 8-bit partition identifier, as illustrated in FIG. 4. Thus, up to $2^{24}$ pages of working space can be referenced, with 1024 words per page and four bytes per word.

As illustrated in FIG. 5, system hardware translates the page address to a physical location by entering an associative memory with the resulting 32-bit page address. If the page address is in the associative memory, a 14-bit page location is produced which is concatenated with a 12-bit byte location within the page. The resulting 26-bit location is the actual location of the byte or word within the memory. At the same time the page location is produced, access control bits are produced to determine whether the program may access the page, alter the page, or whether the page is missing.

If the page reference is not in the associative memory, one of two methods may be used to locate the page as illustrated in FIG. 6. In both methods the partition number is used to enter a table in memory which gives the location of a partition page table.

In the first page location method, a linear page table is entered using the page address as an index, and produces the actual location of a page, as well as access control flags. The location and flags are then put in the associative memory. The linear table requires one entry per page of virtual space reference, and has the disadvantage of being large when large data bases are referenced.

In the second page location method, a psuedo-associative page table in memory is entered with the page address and produces the page location and access flags. The pseudo-associative page table requires approximately four words of table per page of actual memory occupied and therefore requires very little page table to reference very large data bases. The pseudo-associative page table has a disadvantage when the number of pages in core becomes a significant percentage of the total virtual space as either the tables waste space or a significant amount of time is spent managing the tables.

In accordance with another aspect of the invention, programs are divided into logical elements called segments which are retrievably stored in a user's assigned memory space. These segments are referenced to obtain and store data for program execution by means of descriptors which define a partition, a starting point or base within the partition, segment size or bound, and access rights as indicated by access flags of a user to the segment. The access rights may include read, write, execute, and the like. FIG. 7 illustrates one embodiment of a descriptor wherein a pair of 36-bit words combine to define a segment. Word 0 identifies partition register, access flags, and the bound or size of the segment. Word 1 identifies the segment base within the partition. The total segments referenced by a program form the "domain" of the program. A program's domain includes not only the segments permanently linked thereto, but also those segments which are passed to the program by other programs and entry points into other domains for calls and returns, as further described hereinbelow. Advantageously, the parameters or descriptors accessible to a procedure may be verified at the time of creation to be within assigned memory area, thus obviating the need of verifying accessibility during execution. Importantly, a program is able to reference only those segments lying outside its domain which have been passed in a call or return.

To prevent arbitrary alteration of a descriptor during program execution, descriptors are securely stored in special segments in memory which are referenced by three additional descriptor segments. These segments are the linkage segment, the parameter segment, and the argument segment. The linkage segment contains descriptors which have been created by a linker prior to execution or by the operating system during execution. The parameter segment contains descriptors created by the calling procedure during execution, and the argument segment contains descriptors created by the procedure in execution to be passed back to the calling procedure.

Upon execution of a "call" instruction, the contents of all of the descriptor registers are safe-stored for return, the linkage segment descriptor register is loaded with the descriptor for the new linkage segment, and the contents of the argument segment descriptor register are placed in the parameter segment descriptor register for transfer to the called procedure. One form of calling procedure, referred to by applicants as a "Climb" routine, is described in copending application Ser. No. 516,559, filed Oct. 21, 1974, the subject matter of which is incorporated herein by reference. Execution of a "return" instruction reverses the steps whereby the called procedure upon completion of execution loads segment descriptors in its parameter segment descriptor register which becomes the argument descriptor register of the calling procedure upon the return. In accordance with another aspect of the invention, a procedure can move descriptors to the argument segment either intact or reduced by means of a shrinkage routine whereby access to a segment is limited to particular words or data within a segment. A shrinkage procedure, referred to by applicants as a "Shrink" routine, is described in copending application Ser. No. 516,558, filed Oct. 21, 1974, the subject matter of which is incorporated by reference.

FIG. 8 illustrates partition mapping as employed in accordance with the present invention. As described above, each partition 50 is supported by a page table 52 which associates the virtual memory addresses to the corresponding locations in real memory 54. As illustrated, partition 50 includes a plurality of segments labelled A through I such that segment A has a base of 0 and a length or bound of 1000, and segment D has a base of 7000 and a bound of 10,000, segment H has a base of 25,000 and a bound of 2,000, for example. The real memory 54 represents the entire configured actual memory. One of the entities 56 in the real memory is the page table 52 for the illustrative virtual memory.

Assume that system execution is in partition 50 and that the next instruction is at location 5200 in segment D. The base for D is 7000, thus the virtual address is 12,200. Page table 52 shows that the real memory address for the page beginning at 12,000 is 274,000. The references to this page are marked P1 with the first instruction for P1 identified as LDQ (word 2600 in segment G). The base for segment G is 22,000 (from partition 50), and 22,000+2600=24,600. The real page for that virtual page is at 136,000 (from page table 52), and thus the LDQ is loaded from real location 135,600 in real memory 54. All references in FIG. 8 to this operation are noted as 57.

The next instruction says STQ (word 3600 of segment B). The base for B is 1,000 (from partition 50), and 1000+3600=4600. The real page for the virtual page is at 472,000 (from page table 52), and thus STQ is stored in 472,600. All references in FIG. 8 to the operation are noted as 58.

The next instruction says TRA (word 6000 in segment D). The base for D is 7000 (from partition 50), and 7000+6000=13,000. The real page for that virtual page is missing thus causing a hardware page fault and thereby activating a software procedure to seek and locate the missing page from extended or backing memory.

As noted above, in the illustrative embodiment each process may reference a maximum of eight partitions, and each processor contains eight partition registers therefor. Also as noted above, a segment descriptor contains a field for the partition register which indicates a value from 0 to 7, indicating the register containing the assigned number (0 to 255) of the partition to which the segment belongs.

Figure 9:
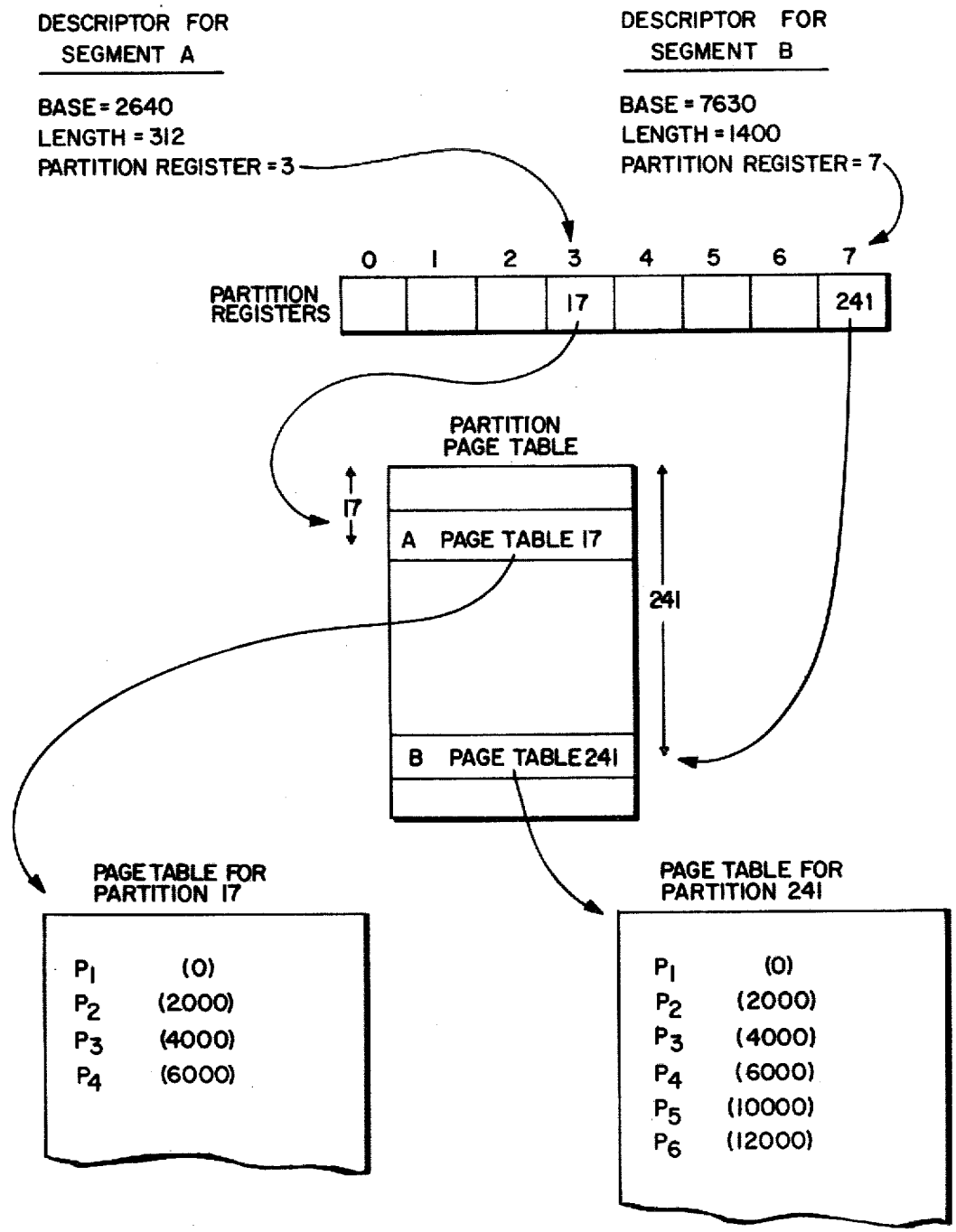
FIG. 9 illustrates descriptor location of program segments in accordance with the invention.

FIG. 9 illustrates the mapping of the location of two words in different segments that are in different partitions; segment A might be a routine in a shared package, and segment B might be one of the user's own routines. It will be noted that the partition register for segment A is 3 and register 7 is used for segment B. The partition registers indicate that A belongs to partition No. 17 and B belongs to partition No. 241. The only use for the partition number is to index into a partition page table that defines the real memory location of the page table supporting the partition. The partition page table also defines the segment page tables for segment A and segment B, as illustrated. In the example at the bottom of FIG. 9 the location 200 of segment B is found by adding 200 to the base of 7630 (7630+200=10,030 in octal), finding the location of the page of 10,000 of that segment (partition register 7, partition No. 241, page table location, 5th entry in page table = P5), and adding 30

(the offset from the beginning of the page). Thus, location 200 of segment B is found at page P5, offset 30.

From FIGS. 8 and 9, it will be noted that in accordance with the present invention there are two levels of memory allocation; partition virtual memory is allocated to program segments, and real memory pages are allocated to partitions. Thus, relative segment addresses may remain fixed in their assigned partition (thereby allowing direct addressing), but actual memory location changes and must be located through the supporting page table.

FIG. 10 illustrates several register combinations and instructions which can be used in the accessing. FIG. 10 illustrates seven different instructions for loading word 200 of segment B of Operand Descriptor Register No. 2 (ODR2) using address register No. 2 (AR2) and index register No. 4 (XR4). The instruction in the far right column might or might not employ the address and index registers.

Assume that the instruction of a program in execution contained the segment descriptor for B in its fourth entry. Then an instruction saying "load ODR2 from the 4th entry" would have allowed the system to use the instruction in line 1, wherein the offset of 200 is specified, index register is not used and the address register is set to 0. It would also allow the instructions in lines 2 through 4 providing the address register and index register were also appropriately loaded.

Lines 5 through 7 of FIG. 10 illustrate the ability to shrink descriptors in accordance with the present invention. In getting the descriptor for segment B, ODR2 would have a base of 7630 and a length of 1400 (from FIG. 9). In lines 5 and 6, however, a "shrink" instruction would have added 100 to the base and reduced the length by at least 100 by additions to the segment base and loading the index or address registers. The shrink instruction can add to the base, subtract from the length, or both. In line 7 at least the base was modified (by 200). The "shrink" procedure applies only to the contents of a Descriptor Register available to a called routine and does not change the memory version of the descriptor word pair.

As noted above, the principal reason for shrinking descriptors is for protection. Assume that a large data segment contains much sensitive information and that a called routine must be able to see only a small portion of the data; then by shrinking the descriptor, the window segment passed to the called routine can become as small as one word. In lines 2 and 7 of FIG. 10 a called routine could access word 200 in segment B with the same instruction in both cases. However, in line 7 there is no way for the routine to access the first 200 words of segment B because the descriptor "begins" at B+200. However, the format of line 2 does permit access to those words because the ODR specifies the beginning of segment B; the called routine simply has to index negatively or change the AR2 value. Thus, line 7 is a secure version while line 2 is not.

As noted above the domain of a procedure includes the segments which are permanently linked to the procedure, either exclusively or shared, and those segments which are passed to it as parameters. As above described, these segments are identified by descriptors (partition, base and bound), and the descriptors are stored in special segments in memory called linkage, parameter and argument segments. The linkage segment contains descriptors which have been created prior to execution or by the operating system during execution. The parameter segment contains descriptors created by a calling procedure, and the argument segment contains descriptors created by the procedure in execution to be passed on to a called procedure.

Figure 11:
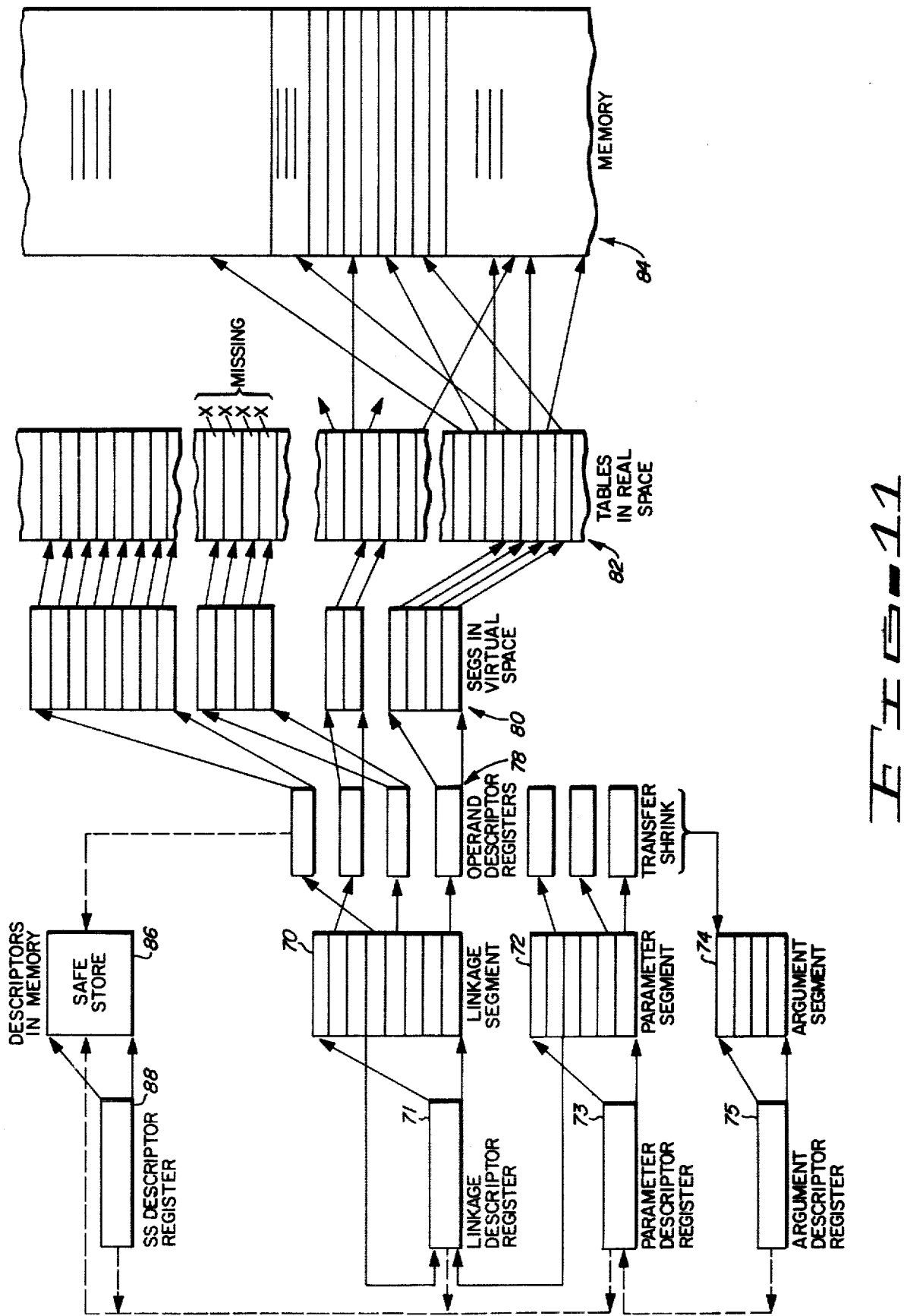
FIG. 11 is a flow diagram illustrating the passing of descriptor parameters between system users and the access of memory through segment descriptors in accordance with the invention.

FIG. 11 is a functional and symbolic block diagram of the stored procedure segment descriptors in linkage segment 70, parameter segment 72, and argument segment 74. To access these segments the linkage descriptor register 71, parameter descriptor register 73, and argument descriptor register 75 must be loaded with the descriptors identifying these segments in memory.

In routine execution, descriptors from linkage segment 70, parameter segment 72 or argument segment 74 are loaded in operand descriptor registers 78. The descriptor's reference segments in virtual space is shown at 80. Real memory locations for the segments are then identified through page tables in real space, as shown generally at 82, which identify the locations in real memory 84, as described above with reference to FIGS. 5 and 6.

Prior to a call, a procedure can move descriptors to the argument segment, either intact or reduced, by means of the shrink operation previously described. Upon execution of the call instruction, all of the descriptor registers are safe stored in segment 86 (as indicated by dotted lines), the linkage segment descriptor register 71 is loaded from the linkage or parameter segment with the descriptor for the new linkage segment, and the descriptors of the argument segment 74 to be passed are placed in the parameter segment 72. Similarly, execution of a return instruction reverses these steps. Execution of call and return instructions, therefore, cause a complete change of domains, with the two domains sharing only those segments passed as parameters of the call.

Descriptors are created and virtual space assigned by the linker program prior to execution, using symbolic names of the segments where they are known. If the name of the segment will not be known until program execution, a large space is assigned in the virtual space, and a descriptor with a trap to the operating system is placed in the linkage segment. As the program is loaded prior to execution, an access permission list, associated with each file segment referenced by the program is checked by the operating system to make certain that the user has permission to access that segment. Access requests which occur during execution of the program are similarly checked for access permission. In addition to verifying access permission to the file segments, the operating system checks the descriptors created by the linker to make certain that they do not allow reference to areas outside of the virtual space accessed by the procedure. Whenever a file segment is to be referenced, the program routine will prepare descriptors for only those fields of a record which the caller is allowed to access, passing the descriptors to the calling procedure on the return. Although the subroutine has access to the entire field, the calling procedure can see only those fields of the record for which descriptors have been created and returned.

Again referring to FIG. 11, and assuming a call, the calling procedure will load the descriptors to be passed to the called procedure in the argument segment 74 described by the argument descriptor register 75. All other register contents of the calling procedure are securely stored in segment 86 described by the safe storage descriptor register 88. The calling procedure is then suspended and the called procedure is loaded.

Upon the loading of the called routine the processor enters an entirely new domain except for the parameters being transferred (and commonly shared descriptors). The descriptors in the parameter segment 72 are employed to access memory in a manner similar to that described above with respect to link descriptor segments.

Upon a return, information is stored by the called procedure and descriptors thereto are stored in the argument descriptor register 75, and control is returned to the initial calling procedure.

In accordance with the present invention, the partitioning of virtual memory and utilization of paging for the real storage of information therein allows flexibility in the manipulation and storing of data with direct access capability, while the segmenting of programs into logical elements and the use of descriptors promotes security of users. Thus, the domains of users are well identified with sensitive portions thereof securely maintained, while the passing of descriptor parameters allows flexibility in domain definition as required. While the invention has been described with reference to its specific embodiments the description is illustrative and is not to be construed as limiting the invention. Various modifications and changes may occur to those skilled in the art without departing from the true spirit and scope of the invention as defined by the appended claims.

We claim:

1. The method of storing and accessing information in the memory of a shared access, multiprogrammed data processing system employing a plurality of descriptor words containing relative addresses for defining the location of a plurality of data storage segments within said system memory, each said relative address including a partition code for accessing a partition page table and a base code for deriving an absolute address from said page table, said method comprising the steps of:
   storing in a first data storage segment of said memory a plurality of descriptor words identifying selected memory segments containing data required for execution of a first data processing program;
   loading in a first descriptor register a descriptor word identifying said first data storage segment when said first program is to be executed;
   executing said first program by inserting descriptor words from said first data storage segment into operand descriptor register means to enable accessing of information called for by said program, the relative address data contained in the descriptors inserted into said operand register means being converted into absolute address data for accessing specific storage cells in said memory;
   storing in a second data storage segment of said memory, during execution of said first program, selected descriptor words identifying data storage segments containing data required for execution of a second data processing program;
   storing in a second descriptor register a descriptor word identifying said second data storage segment;
   conditioning said system to execute said second program by storing in said first descriptor register and said descriptor word in said second descriptor register, thereby causing said second data storage segment to become said first data storage segment;
   executing said second program by inserting descriptor words from said first data storage segment into said operand descriptor register means to enable accessing of specific storage cells in said memory; and
   inserting into said operand register means during the execution of said programs only descriptor words contained in the data storage segment defined by the descriptor stored in said first descriptor register to provide secure memory accessing during the execution of said first and second programs.

2. The method set forth in claim 1 wherein said steps of executing include the further step of inserting descriptor words from said memory into a plurality of operand descriptor registers within said operand descriptor register means.

3. The method set forth in claim 1 comprising the further step of transferring, prior to said step of conditioning, the contents of said first descriptor register and said operand descriptor register means into a designated data storage segment of said memory to preserve the execution status of said first program.

4. The method set forth in claim 1 wherein, within said step of executing, said relative address data is converted into absolute segment address data by a method comprising the steps of:
   accessing a page table stored in said memory by entering said memory at a first address location derived from said partition code;
   extracting from said first address location an address word; and
   deriving said absolute segment address data by combining said address word and said segment base code with an offset code.

5. The method of storing and accessing information in the memory of a shared access, multiprogrammed data processing system employing a plurality of descriptor words containing relative addresses for defining the location of a plurality of data storage segments within said system memory, each said relative address including a partition code for accessing a partition page table and a base code for deriving an absolute address from said page table, said method comprising the steps of:
   storing in first and second segments of said memory a plurality of descriptor words identifying selected memory segments containing data required for execution of a first data processing system;
   loading in first and second descriptor registers descriptor words identifying said first and second segments, respectively, when said first program is to be executed;
   executing said first program by inserting descriptor words from said first segment into operand descriptor register means to access information called for by said program, the relative address data contained in the descriptors inserted into said operand register means being converted into absolute address data to enable accessing of specific storage cells in said memory;
   storing in a third segment of said memory, during execution of said first program, descriptor words identifying memory segments containing data required for execution of a second data processing program;
   storing in a third descriptor register a descriptor word identifying said third data storage segment;
   conditioning said system to execute said second program by storing in said first descriptor register said descriptor word in said third descriptor register, thereby causing and third data storage segment to become said first data storage segment;

executing said second program by inserting descriptor words from said first segment into said operand descriptor register means to enable accessing of specific storage cells in said memory; and inserting into said operand register means only descriptor words contained in the memory segments defined by the descriptors stored in said first descriptor register during the execution of said first and second programs to provide secure memory accessing.

* * * * *